Patented Jan. 2, 1934

1,942,108

UNITED STATES PATENT OFFICE 1,942,108

HYDROXY-BENZO-QUINOLINE-CARBOXYLIC ACIDS

Leopold Laska and Oskar Haller, Offenbach-on-the-Main, Germany, assignors to General Aniline Works, Inc., New York, N. Y., a corporation of Delaware No Drawing. Application March 16, 1932, Serial No. 599,342, and in Germany March 25, 1931

6 Claims. (Cl. 260—40)

The present invention relates to hydroxy-benzo-quinoline-carboxylic acids, more particularly its relates to compounds corresponding to the following general formula:

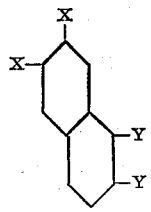

wherein one X stands for hydroxyl, the other X for carboxyl, and the Y's jointly stand for the grouping

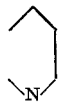

We have found that hydroxy-benzo-quinoline-carboxylic acids containing the hydroxyl- and the carboxylic acid group in the benzene radical and not in ortho-position to the quinoline nucleus, are obtainable by heating to an elevated temperature an alkali metal salt of such a hydroxy-benzo-quinoline with carbon dioxide at a raised pressure.

This course of reaction was not to be expected, inasmuch as phenol-derivatives containing basic groups generally do not yield carboxylic acids under like conditions (cf., for instance, U. S. Patent No. 1,823,748, page 1, lines 25–29).

The hydroxy-benzo-quinolines used as starting materials may be prepared by subjecting 1.6-, 1.7-, 2.6- or 2.7-naphthylaminosulfonic acids to Skraup's reaction and then melting the sulfo-benzo-quinolines thus obtained together with caustic alkali; the hydroxy-benzo-quinolines are soluble in dilute caustic alkalies and yield yellow, soluble chlorhydrates.

The new hydroxycarboxylic acids thus obtained are valuable intermediate products for the preparation of dyestuffs.

The following examples serve to illustrate the invention, but they are not intended to limit it thereto, the parts being by weight:

(1) 195 parts of 2'-hydroxy-5.6-benzo-quinoline of the formula:

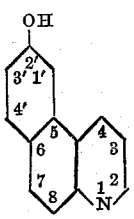

(which may be prepared by subjecting 2.7-naphthyl-aminosulfonic acid to Skraup's reaction and melting together 2'-sulfo-5.6-benzo-quinoline thus obtained with caustic alkali and which melts after recrystallization from trichlorobenzene at 243° C. with slight decomposition) are dissolved with 56 parts of potassium hydroxide and 1000 parts of water in an autoclave provided with a stirrer; thereupon the water is distilled off in vacuo until the potassium salt obtained is completely dried. After cooling, carbon dioxide is introduced into the reaction mass while gradually increasing the pressure to 50 atmospheres, the whole is then heated to 230° C. and heating is continued for 10–12 hours. The melt is allowed to cool and then dissolved with a large quantity of hot water, the solution is filtered with suction and the 2'-hydroxy-5.6-benzo-quinoline-3'-carboxylic acid thus obtained is precipitated by means of hydrochloric acid. The said carboxylic acid may be further purified by dissolving and reprecipitating it from sodium acetate solution; it dissolves very difficultly in most of the organic solvents. It crystallizes from quinoline in the form of a yellowish-gray powder melting at 315° C. with decomposition. The new acid gives in alcoholic solution a reddish-brown coloration on the addition of a few drops of ferric chloride solution and it is, therefore, to be assumed that the carboxylic acid group has entered an ortho-position to the hydroxy group.

The reaction may be carried out in the same manner by using the sodium salt of 2'-hydroxy-5.6-benzo-quinoline.

(2) 1950 parts of 3'-hydroxy-5.6-benzo-quinoline (which may be prepared by subjecting 2.6-naphthylaminosulfonic acid to Skraup's reaction and melting together 3'-sulfo-5.6-benzo-quinoline thus obtained with caustic alkali and which melts after recrystallization from trichlorobenzene at 276° C. with slight decomposition) are treated with 560 parts of potassium hydroxide and 3000 parts of water in the manner described in Example 1. After cooling, carbon dioxide is introduced into the potassium salt which has been formed, while gradually increasing the pressure to 50 atmospheres, the whole is then heated to 220° C.-230° C. and heating is continued for 10 hours. The melt is allowed to cool and then dissolved in hot water, the solution is filtered by suction and the carboxylic acid obtained is precipitated by addition of hydrochloric acid until the reaction has become neutral. In order to purify the carboxylic acid from unchanged 3'-hydroxy-5.6-benzo-quinoline, it is dissolved in a sodium acetate solution and again precipitated by means of dilute hydrochloric acid. The 3'-hydroxy - 5.6 - benzo - quinoline-2'-carboxylic acid thus obtained which corresponds to the following formula:

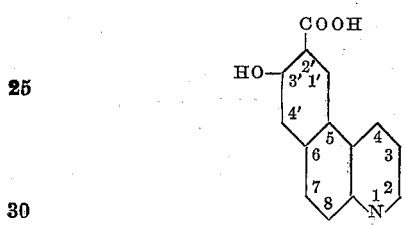

is insoluble in most of the organic solvents and crystallizes from quinoline in the form of a brownish-yellow powder melting at 340° C.-342° C. In alcoholic solution it gives a deep red coloration on the addition of ferric chloride solution.

The yield of the carboxylic acids is increased by treating the potassium salt of hydroxy-benzo-quinoline at first with carbon dioxide at a pressure of 100 atmospheres and only then heating it.

In a corresponding manner there may be obtained from 2'-hydroxy-7.8-benzo-quinoline (which may be prepared from 1.6-naphthylaminosulfonic acid as stated above and which melts after recrystallization from trichlorobenzene at 268° C. with slight decomposition) the 2'-hydroxy - 7.8 - benzo-quinoline-3'-carboxylic acid having the following formula:

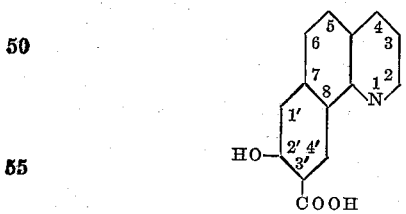

It crystallizes from a mixture of equal parts of trichloro-benzene and quinoline in the form of a yellow powder melting at 330° C. and gives in alcoholic solution a cherry-red coloration on the addition of ferric chloride.

The 3'-hydroxy-7.8-benzo-quinoline-2'-carboxylic acid of the following constitution:

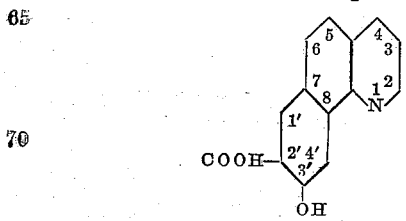

—obtainable from 3'-hydroxy-7.8-benzo-quinoline (which latter is prepared from 1.7-naphthylaminosulfonic acid and melts when recrystallized from trichlorobenzene at 188° C. with slight decomposition)—forms after recrystallization from trichlorobenzene a yellow powder melting at 295° C. and gives in alcoholic solution a violet coloration on the addition of ferric chloride.

We claim:

1. The compounds of the following general formula:

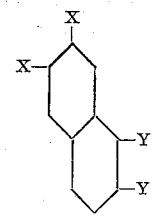

wherein one X stands for hydroxyl, the other X for carboxyl, and the Y's jointly stand for the grouping

being crystallized colored compounds, very difficultly soluble in most of the organic solvents, soluble in dilute alkalies and giving in alcoholic solution intense colorations on the addition of ferric chloride.

2. The compounds of the following general formula:

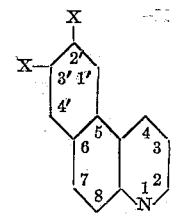

wherein one X stands for hydroxyl and the other X for carboxyl, being crystallized colored compounds very difficultly soluble in most of the organic solvents, soluble in dilute alkalies and giving in alcoholic solution intense colorations on the addition of ferric chloride.

3. The compound of the following formula:

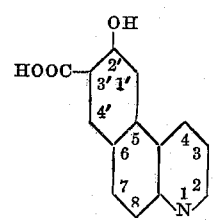

being a crystallized yellowish-gray powder melting at 315° C. with decomposition, very difficultly soluble in most of the organic solvents, soluble in dilute alkalies and giving in alcoholic solution a reddish-brown coloration on the addition of ferric chloride.

4. The compound of the following formula:

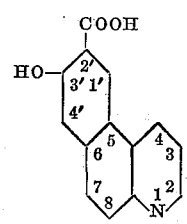

being a crystallized brownish-yellow powder melting at 340° C.-342° C., very difficultly soluble in most of the organic solvents, soluble in dilute alkalies and giving in alcoholic solution a deep red coloration on the addition of ferric chloride.

5. The compounds of the following formula:

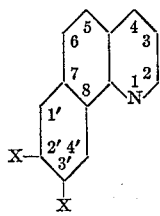

wherein one X stands for hydroxyl and the other X for carboxyl, being crystallized colored compounds very difficultly soluble in most of the organic solvents, soluble in dilute alkalies and giving in alcoholic solution intense colorations on the addition of ferric chloride.

6. The compound of the following formula:

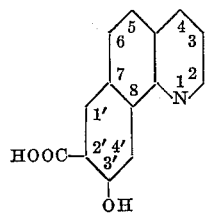

being a crystallized yellow powder melting at 295° C., very difficultly soluble in most of the organic solvents, soluble in dilute alkalies and giving in alcoholic solution a violet coloration on the addition of ferric chloride.

LEOPOLD LASKA.
OSKAR HALLER.